United States Patent [19]

Hobes et al.

[11] 4,446,311

[45] May 1, 1984

[54] PROCESS FOR PREPARING PULVERULENT ETHYLENE POLYMERS

[75] Inventors: John Hobes, Dinslaken; Wolfgang Payer, Wesel; Detlef Deymann, Essen, all of Fed. Rep. of Germany

[73] Assignee: Ruhrchemie Aktiengesellschaft, Oberhausen, Fed. Rep. of Germany

[21] Appl. No.: 388,572

[22] Filed: Jun. 14, 1982

Related U.S. Application Data

[63] Continuation of Ser. No. 216,224, Dec. 15, 1980, abandoned.

[30] Foreign Application Priority Data

Dec. 19, 1979 [DE] Fed. Rep. of Germany ....... 2951122

[51] Int. Cl.$^3$ ................................................ C08F 8/22
[52] U.S. Cl. .................................... 528/493; 528/492; 528/494; 528/495; 528/497; 528/498
[58] Field of Search ............... 528/492, 493, 494, 495, 528/497, 498

[56] References Cited

U.S. PATENT DOCUMENTS

| | | | |
|---|---|---|---|
| 2,870,113 | 6/1959 | Jones | 528/502 |
| 3,008,946 | 11/1961 | Rhodes | 528/502 |
| 3,154,530 | 10/1964 | Mullen | 528/502 |
| 3,634,385 | 1/1972 | Walles | 528/493 |
| 3,676,419 | 7/1972 | Takehisa | 528/493 |
| 3,814,737 | 6/1974 | Gilbert | 528/493 |
| 3,971,749 | 7/1976 | Blunt | 528/502 |
| 4,038,477 | 7/1977 | Inoue | 528/487 |

*Primary Examiner*—C. A. Henderson
*Attorney, Agent, or Firm*—Sprung, Horn, Kramer & Woods

[57] ABSTRACT

A process for preparing pulverulent ethylene homopolymers or copolymers with a grain size of less than 200 μm which comprises contacting coarse-particled ethylene homopolymers or copolymers in the form of a suspension with an aliphatic ketone containing 3 to 10 carbon atoms, heating the same with a mixture of said ketone up to a temperature above the softening point of the polymer and thereafter cooling the same.

16 Claims, No Drawings

PROCESS FOR PREPARING PULVERULENT ETHYLENE POLYMERS

This is a continuation, of application Ser. No. 216,224, filed Dec. 15, 1980, now abandoned.

There was, therefore, the need to develop a simple and economically realizable process for producing pulverulent ethylene homopolymers or copolymers with a grain size <200 μm and a bulk weight above 0.2 g/cm$^3$ which are in particular suitable for producing coatings by the dip and spray methods.

SUMMARY OF THE INVENTON

The afore-described objective is surprisingly achieved by a process for producing pulverulent ethylene homopolymers or copolymers with a grain size <200 μm in which coarseparticled ethylene homopolymers or copolymers are suspended in an aliphatic ketone containing 3 to 10 carbon atoms, the suspension is heated at temperatures above the softening point range of the polymer, and is then cooled.

The procedure according to the invention can be used both for homopolymers and also copolymers of ethylene in particular for those polymers which were obtained from the monomers under high pressure and in the presence of radical-forming initiators such as oxygen, organic peroxides, or azo compounds.

All polymers having melt indices (190° C./2 kg) of about 0.1 to about 500 g/10 minutes can be used as ethylene homopolymers.

Ethylene copolymers are particularly suitable as starting substances for preparing the pulverulent products according to the new process. Such copolymers are understood as being compounds which contain, in addition to ethylene, for example $C_3$- to $C_8$-alkenes, esters of $C_3$- to $C_{12}$-alkenecarboxylic acids, vinyl and-/or alkenyl esters, vinyl and/or alkenyl ethers, vinyl and/or alkenyl alcohols, N-vinyl and/or N-alkenyl compounds such as N-vinylpyrrolidone, N-vinylcarbazole, N-vinylcaprolactam, acrylamide and/or methacrylamide, acrylonitrile and/or methacrylonitrile, alkenyl halides such as vinyl fluoride and/or vinylidene fluoride, vinyl and/or alkenyl ketones, vinyl and/or alkenyl sulphones and vinyl and/or alkenyl sulphonates. In addition to ethylenically unsaturated compounds, other copolymerizable substances such as carbon monoxide and sulphur dioxide may also be incorporated by polymerization. Generally, these copolymers have melt indices between 0.1 and 1000, preferably between 0.5 and 500 g/10 min.

The coarse polymers treated in accordance with the invention generally have particle sizes above 200 μm, and especially above 500 μm and generally in the range of 1000 to 5000 μm.

According to a preferred variant of the new process, the preparation of the pulverulent polymer may be coupled with a chemical conversion of the copolymer.

Surprisingly, in this case too particles of the desired grain size are obtained despite the occurrence of a chemical reaction. For example, ethylene copolymers containing more than 50% by weight of ethylene, 0 to 25% by weight of esters of $C_3$ to $C_{12}$-alkenecarboxylic acids with $C_3$- to $C_8$-sec. or $C_4$- to $C_8$-tert. alcohols, 1 to 25% by weight of $C_3$- to $C_{12}$-alkenecarboxylic acids and optionally minor amounts of conventional further monomers copolymerizable with ethylene can be obtained by saponifying copolymers containing at least 50% by weight of ethylene, 2 to 50% by weight of esters of $C_3$- to $C_{12}$-alkenecarboxylic acids with $C_3$- to $C_8$-sec. or $C_4$- to $C_8$-tert. alcohols, up to 3% by weight of $C_3$- to $C_{12}$-alkenecarboxylic acids, as well as minor amounts of further monomers copolymerizable with ethylene.

For this purpose, a suspension of the polymer is prepared in the suspension agent used according to the invention, the suspension is heated to a temperature above the softening point range of the polymer, and the ester is split with the aid of acid catalysts. Acids can be added in an amount of 0.5 to 5.0 weight percent, based upon the weight of the copolymer. Acids which can be employed for the conversion of the copolymer (saponification) include mineral acids and organic acids. Particularly contemplated acids include sulfuric acid and toluene-4-sulfonic acid.

The acid treatment is effected for a period of time sufficient to saponify a major amount of the moieties of the copolymer derived from the $C_3$- to $C_{12}$-alkenecarboxylic acid esters. Generally speaking, the period of saponification is at least 15 minutes and up to about 240 minutes.

The reduction of the particle size of the olefin, homo- or copolymers, in accordance with the invention, is conducted by the use of ketones. These ketones function as suspension agents for the polymers and together with the heat treatment and cooling effect a dramatic size reduction of the particles coupled with an improvement in the grain size distribution. Ketones with 3 to 10 carbon atoms are particularly useful as suspension agents for the polymers. The choice of the suitable ketone depends, inter alia, upon its boiling points and the softening point range of the particular polymer in question. Methyl ethyl ketone, methyl isopropyl ketone and methyl isobutyl ketone have proven particularly suitable. The ketones can be used alone or in the form of mixtures.

One can add liquids such as alcohols, ethers, hydrocarbons or nitromethane as known polymer precipitation agents to the ketones, and moreover, one can add polymer solvents, e.g. to toluene or xylene, in amounts of less than 50% by weight, preferably 10 to 40% by weight.

The weight ratio of polymer to suspension agent may vary within a wide range. It is, however, recommended to use 5 to 15 parts by weight of suspension agent per 1 part by weight of polymer.

An essential feature of the process according to the invention is to heat the suspension of polymer and suspension agent to temperatures above the softening point range of the polymer. By the term softening point range is understood the temperature region in which the polymer begins to soften and fuse. This region depends on the nature of the polymer and degree of polymerization and is generally between 80° and 120° C. Of course, one can also operate at temperatures substantially above the softening range, say up to 200° C., However, for economic reasons, it is recommended in most cases not to exceed the softening point range by more than 5° to 10° C. Generally, after the heating the polymer is cooled to at least 50° C., generally to room temperature.

During the heating and subsequent cooling procedure, the solid phase, i.e. the polymer, and the liquid phase, i.e. the suspension agent, must be sufficiently intermixed. In general, simple stirring suffices. However, in special cases other mixing methods, e.g. mixing with turbo-stirrers or by means of ultra-sound, can also be used.

When the coarse-grained polymer is heated in the suspension agent, it swells and expands greatly and on cooling breaks down, mixed with the suspension agent, into a fine-grained powder. The use of the suspension agents according to the invention ensures, inter alia, that no lumps are formed during cooling of the polymer. A very fine powder free from oversized particles and having a very narrow grain distribution, is obtained this way and without adding precipitation agents.

The polymer particles have a grain size, i.e. a diameter below 200 μm. The bulk weight of the powder is above 0.2 g/cm³. The grain size of the polymer particles can be varied by the intensity of the mixing. Vigorous mixing, such as is achieved, for example, with the aid of a turbo-stirrer, produces polymer particles having a diameter of 50 μm and less.

The process according to the invention may be carried out at normal pressure or also at elevated pressure. The use of high pressures also enables suspension agents to be used whose boiling points under normal conditions are below the softening points of the polymers. The pressure can be as high as 20 bar and higher.

The finely powdered products according to the invention are outstandingly suitable for producing coatings on widely differing substrates according to known powder coating methods. Fluidized bed coating, flame spraying and electrostatic powder coating may be mentioned in this context. Appropriate methods are described by E. Gemmer in the article "Die Kunststoffsinterverfahren" (Plastics sinter methods) in Kunststoff und Gummi, 4 (1965), No. 12 pages 438/443.

The finely powdered products obtained according to the new process can also be used as adhesive auxiliaries for bonding e.g. metals, wood, plastics, glass, to one another or to other substrates.

The finely particulate polymers may contain known additives. Fillers, plasticizers, dyes and pigments may be mentioned in this connection. Particularly, light and impact-resistant coatings are obtained by adding organic expanding agents.

The adhesion of the polymer layer to the substrate is improved if the object to be coated is treated, before coating, with a solvent or mechanically to remove grease, fat, oils or other interfering impurities such as oxide layers.

In order to more fully illustrate the nature of the invention and the manner of practicing the same, the following examples are presented.

COMPARISON EXAMPLE 1

500 g of polyethylene granulate (melt index (190° C./2 kg); 0.5 g/10 minutes) in 2.5 l of xylene is placed in a 10 liter volume flask provided with a stirrer and reflux condenser.

The granulate begins to dissolve above 110° C., and the mixture is stirred further for about 30 minutes at 120° C. After cooling to 50° C., the polymer is precipitated with 5 liters of acetone. The powder is filtered off and dried in vacuo at 60° C.

| Grain distribution: | | |
|---|---|---|
| up to 32 μm | = | 9.8% by weight |
| >32 μm–45 μm | = | 23.5% by weight |
| >45 μm–63 μm | = | 8.2% by weight |
| >63 μm–100 μm | = | 5.4% by weight |
| >100 μm–160 μm | = | <1% by weight |
| >160 μm | = | 52.1% by weight |

Bulk weight: 0.156 g/cm³.

COMPARISON EXAMPLE 2

100 g of granulate of an ethylene-tert.-butyl acrylate-vinyl acetate terpolymer (composition: 19.5% by weight tert.-butyl acrylate, 3.0% by weight vinyl acetate; melt index (190° C./2 kg): 120 g/10 minutes) in 600 ml of toluene and 2.8 g of toluene-4-sulphonic acid monohydrate (1/10 of the amount equivalent to the tert.-butyl acrylate) in 25 ml of 85% formic acid are placed in a 2 liter volume flask provided with a stirrer and reflux condenser.

After 2 hours' reaction at 110° C., the reaction mixture is cooled to 50° C. and the polymer is precipitated with 1200 ml of acetone. The powder is filtered off, washed with water till neutral, and dried at 60° C. in vacuo. 84 g of white powder containing 10.8% by weight of acrylic acid and 3.0% by weight of vinyl acetate is obtained.

Melt index (190° C./2 kg): 21 g/10 minutes.

| Grain distribution: | | |
|---|---|---|
| up to 32 μm | = | 11.1% by weight |
| >32 μm–45 μm | = | 30.0% by weight |
| >45 μm 63 μm | = | 6.7% by weight |
| >63 μm 100 μm | = | 8.9% by weight |
| >100 μm 160 μm | = | 1% by weight |
| >160 μm | = | 42.3% by weight |

Bulk weight: 0.173 g/cm³.

EXAMPLE 1

100 g of granulated high pressure polyethylene (melt index (190° C./2 kg): 0.4 g/10 minutes), 800 ml of methyl isobutyl ketone and 200 ml of an aliphatic hydrocarbon mixture with a boiling point range of about 140°–160° C. are placed in a 2 liter volume flask provided with a stirrer, reflux condenser and contact thermometer. After a homogenization time of 30 minutes at 110° C., the mixture is cooled to 30° C. while stirring (600 revs./minute), and the polymer is filtered off, washed with acetone and dried in a fluidized bed dryer. A white powder is obtained.

Melt index (190° C./2 kg): 0.35 g/10 minutes.

| Grain distribution | | |
|---|---|---|
| up to 32 μm | = | 6.4% by weight |
| >32 μm–45 μm | = | 11.2% by weight |
| >45 μm 65 μm | = | 16.3% by weight |
| >63 μm 100 μm | = | 22.5% by weight |
| >100 μm 160 μm | = | 35.0% by weight |
| >160 μm | = | 8.6% by weight |

Bulk weight: 0.310 g/cm³

EXAMPLE 2

100 g of granulated high pressure polyethylene (melt index 190° C./2 kg): 19 g/10 minutes) 800 ml of methyl isobutyl ketone and 100 ml of an aliphatic hydrocarbon mixture are placed in a 2 liter flask provided with a stirrer, reflux condenser and contact thermometer. After a homogenization time of 30 minutes at 110° C., the mixture is cooled to 30° C. while stirring (600 revs.-/minute), and the polymer is filtered off, washed with acetone and dried in a fluidized bed dryer. A white powder is obtained.

Melt index (190° C./2 kg): 16.6 g/10 minutes.

| Grain distribution: | | |
| --- | --- | --- |
| up to 32 μm | = | 10.0% by weight |
| >32–45 μm | = | 13.8% by weight |
| >45–63 μm | = | 21.3% by weight |
| >63–100 μm | = | 22.5% by weight |
| >100–160 μm | = | 28.8% by weight |
| >160 μm | = | 3.6% by weight |
| Bulk weight: 0.318 g/cm$^3$ | | |

EXAMPLE 3

300 g of granulated ethylene-tert.-butyl acrylate-vinyl acetate terpolymer (composition: 19.0% by weight tert.-butyl acrylate and 4.3% by weight vinyl acetate; melt index (190° C./2 kg): 110 g/10 minutes), 1500 ml of methyl isobutyl ketone and 28 g of toluene-4-sulphonic acid monohydrate (⅓ of the amount equivalent to the tert.-butyl acrylate) in 300 ml of 85% formic acid are placed in a 2 liter flask provided with a stirrer and a reflux condenser. After 2 hours' reaction at 105° C. (reflux temperature) the reaction mixture is cooled, while stirring, to room temperature and the product is filtered off. After the product has been washed 4 times with water, each time with 2 liters, and then once with 500 ml of acetone, it is dried at 60° C. in vacuo, 263 g of a white powder containing 10.5% by weight of acrylic acid and 4.2% by weight of vinyl acetate is obtained.

Melt index: (190° C./2 kg): 20 g/10 minutes.

| Grain distribution | | |
| --- | --- | --- |
| up to 32 μm | = | 34.1% by weight |
| >32–45 μm | = | 29.8% by weight |
| >45–63 μm | = | 19.8% by weight |
| >63–100 μm | = | 8.4% by weight |
| >100 μm | = | 7.9% by weight |
| Bulk weight: 0.355 g/cm$^3$. | | |

EXAMPLE 4

300 g of granulated ethylene-tert.-butyl acrylate-acrylic acid-vinyl acetate copolymer (composition: 16.8% by weight tert. butyl acrylate, 0.8% by weight acrylic acid, 2.7% by weight vinyl acetate; melt index (190° C./2 kg): 24 g/10 minutes), 1000 g of methyl ethyl ketone, 300 g of xylene and 38 g of H$_2$SO$_4$ (98%; twice the amount equivalent to the tert.-butyl acrylate) are placed in a 2 liter flask provided with a stirrer and reflux condenser.

After 2 hours' reaction at 90° C. (reflux temperature) the reaction mixture is cooled while stirring, and the product is filtered off extracted at the reflux temperature (75° C.) with a solution of 9 parts of methyl ethyl ketone and 1 part of acetone, and then dried in vacuo at 60° C. 266 g of white powder containing 10.5% by weight of acrylic acid and 2.6% by weight of vinyl acetate is obtained.

Melt index (190° C./2 kg): 4.6 g/10 minutes.

| Grain distribution: | | |
| --- | --- | --- |
| up to 32 μm | = | 17.4% by weight |
| >32–45 μm | = | 38.2% by weight |
| >45 63 μm | = | 27.1% by weight |
| >63 100 μm | = | 8.1% by weight |
| >100 μm | = | 9.2% by weight |
| Bulk weight: 0.333 g/cm$^3$ | | |

EXAMPLE 5

300 g of granulated ethylene-tert.-butyl acrylate-vinyl acetate terpolymer (composition: 12% by weight tert.-butyl acrylate, 5.7% by weight vinyl acetate; melt index (190° C./2 kg): 78 g/10 minutes), 1.2 liters of methyl ethyl ketone, 21 g of H$_2$SO$_4$ (98%); 1.5 times the amount equivalent to the tert.-butyl acrylate) are placed in a 2 liter flask provided with a stirrer and reflux condenser.

After 2 hours' reaction at 80° C. (reflux temperature) the reaction mixture is cooled while stirring and the product is filtered off, washed till neutral with water, rinsed with acetone, and dried at 60° C. in vacuo. 269 g of white powder containing 6.6% by weight of acrylic acid and 5.6% by weight of vinyl acetate is obtained.

Melt index (190° C./2 kg): 20 g/10 minutes.

| Grain distribution: | | |
| --- | --- | --- |
| up to 32 μm | = | 36.9% by weight |
| >32–45 μm | = | 26.2% by weight |
| >45 63 μm | = | 16.7% by weight |
| >63 100 μm | = | 9.5% by weight |
| >100 μm | = | 10.7% by weight |
| Bulk weight: 0.368 g/cm$^3$. | | |

EXAMPLE 6

200 g of granulated ethylene-tert.-butyl acrylate-vinyl acetate terpolymer (composition: 19.8% by weight t-BA, 3.0% by weight vinyl acetate; melt index (190° C./2 kg); 120 g/10 minutes), 900 g of methyl ethyl ketone, 100 g of an aliphatic hydrocarbon mixture having a boiling point range of about 140° to 160° C. and 15 g of H$_2$SO$_4$ (the amount equivalent to the tert.-butyl acrylate) are placed in a 2 liter flask provided with a stirrer and reflux condenser. After 2 hours' reaction at 79° C. (reflux temperature) the reaction mixture is cooled while stirring and the product is filtered off. After washing 4 times with water, each time with 2 liters, and subsequent washing with 500 ml of acetone, the product is dried at 60° C. in a vacuum drying cupboard. 175 g of a white powder containing 11.1% by weight of acrylic acid and 2.7% by weight of vinyl acetate is obtained.

Melt index (190° C./2 kg): 23.6 g/10 minutes.

| Grain distribution: | | |
| --- | --- | --- |
| up to >32 μm | = | 33.3% by weight |
| >32–45 μm | = | 39.2% by weight |
| >45 63 μm | = | 21.6% by weight |
| >63 100 μm | = | 3.9% by weight |
| >100 μm | = | 2.0% by weight |
| Bulk weight: 0.358 g/cm$^3$ | | |

EXAMPLE 7

200 g of granulated ethylene terpolymer (composition: 16.4% by weight tert.-butyl acrylate, 3.0% by weight acrylic acid; melt index (190° C./2 kg): 3.2 g/10 minutes), 800 g of methyl ethyl ketone, 230 g of an aliphatic hydrocarbon mixture having a boiling point range of about 140° to 160° C., and 12.6 g of H$_2$SO$_4$ (98%; the amount equivalent to the tert.-butyl acrylate)

are placed in a 2 liter flask provided with a stirrer and reflux condenser.

After 2 hours' reaction at 79° C., the reaction mixture is cooled while stirring, and the product is suction filtered, extracted with methyl ethyl ketone at 78° C., and then dried at 40° C. in a fluidized bed dryer. 180 g of a white powder containing 12.2% of acrylic acid is obtained.

Melt index (190° C./2 kg): 0.8 g/10 minutes.

| Grain distribution: | | |
|---|---|---|
| up to 32 μm | = | 31.4% by weight |
| >32-45 μm | = | 40.3% by weight |
| >45-65 μm | = | 24.1% by weight |
| >63 100 μm | = | 2.0% by weight |
| >100 μm | = | 2.2% by weight |
| Bulk weight: 0.363 g/cm$^3$. | | |

EXAMPLE 8

200 g of granulated ethylene-vinyl acetate copolymer (composition: 79.3% by weight of ethylene, 20.7% by weight of vinyl acetate: melt index (190° C./2 kg): 27 g/10 minutes), 800 ml of methyl ethyl ketone and 200 ml of an aliphatic hydrocarbon mixture having a boiling point range of about 140° to 160° C. are placed in a 2 liter flask provided with a stirrer, reflux condenser and contact thermometer. After a homogenization time of about 30 minutes at 78° C., the mixture is cooled to 30° C., while stirring (600 revs./minute), and the product is suction filtered, washed with acetone and dried in a fluidized bed dryer. Melt index (190° C./2 kg): 25.8 g/10 minutes.

| Grain distribution: | | |
|---|---|---|
| up to 32 μm | = | 4.0% by weight |
| >32-45 μm | = | 13.2% by weight |
| >45-63 μm | = | 22.8% by weight |
| >63-100 μm | = | 37.5% by weight |
| >100-160 μm | = | 14.1% by weight |
| >160 μm | = | 8.4% by weight |
| Bulk weight: 0.332 g/cm$^3$. | | |

What is claimed is:

1. A process for preparing pulverulent ethylene homo/copolymers with a grain size <200 μm, which comprises contacting coarse-particles ethylene homopolymers or copolymers with an aliphatic ketone selected from the group consisting of methyl ethyl ketone, methylisopropyl ketone, methylisobutyl ketone and mixtures thereof, heating the suspension to a temperature above the softening point range of the polymer and thereafter cooling the suspension.

2. A process according to claim 1, wherein the polymer treated is an ethylene copolymer and during the treatment of the coarse particled ethylene copolymer at a temperature above its softening point, the same is contacted with an acid catalyst.

3. A process according to claim 2, wherein the contact of the copolymer with an acid catalyst is carried out for a period of time between 2 and 3 hours.

4. A process according to claim 1, wherein the polymer so treated is an ethylene copolymer of melt index (190° C./2 kg) of 0.1 to about 500 g/10 min.

5. A process according to claim 1, wherein the ethylene polymer treated is an ethylene copolymer containing more than 50% by weight ethylene, 0 to 25% by weight of an ester of $C_3$ to $C_{12}$ alkenecarboxylic acid with $C_3$ to $C_8$-sec. or $C_4$ to $C_8$ tert. alcohols and 1 to 25% by weight of $C_3$ to $C_{12}$ alkenecarboxylic acids.

6. A process according to claim 1, wherein the process is carried out in the presence of an alcohol, ether, aliphatic hydrocarbon, aromatic hydrocarbon, nitromethane, toluene or xylene, in an amount of less than 50% by weight based upon the weight of said ketone.

7. A process according to claim 6, wherein said alcohol, ether, aliphatic hydrocarbon, aromatic hydrocarbon, nitromethane, toluene or xylene is presented in an amount of from 10 to 40% by weight based upon the weight of said ketone.

8. A process according to claim 1, wherein there are 5 to 15 parts by weight of said ketone per part by weight of polymer.

9. A process according to claim 1, wherein the thermal treatment of the coarse particled ethylene homopolymer or copolymer is carried out in the presence of the ketone at a temperature which is 5° to 10° C. above the softening point range of the polymer.

10. A process according to claim 1, wherein the process is conducted by stirring or agitating the suspension while it is heated.

11. A process according to claim 5, wherein said ethylene polymer contains a minor amount of a monomer copolymerizable with ethylene.

12. A process for preparing pulverulent ethylene homo or copolymer with a grain size <200 μm which consists essentially of contacting coarse-particles ethylene homopolymers or copolymers with a composition consisting essentially of an aliphatic ketone selected from the group consisting of methyl ethyl ketone, methyl isopropyl ketone, methyl isobutyle ketone and mixtures thereof, heating the suspension to a temperature above the softening point of the polymer and thereafter cooling the suspension.

13. A process according to claim 12 wherein said coarse particles ethylene homopolymers or copolymers have a particle size of 500 μm.

14. A process according to claim 13, wherein said coarse particles ethylene homopolymers or copolymers have a particle size in the range of 1000 to 5000 μm.

15. A process according to claim 13, wherein said ethylene homopolymers or copolymers have a melt index between 0.1 and 1000 g/10 min.

16. A process according to claim 15, wherein said ethylene homopolymers or copolymers have a melt index between 0.5 and 500 g/10 min.

* * * * *

UNITED STATES PATENT AND TRADEMARK OFFICE
CERTIFICATE OF CORRECTION

PATENT NO. : 4,446,311
DATED : May 1, 1984
INVENTOR(S) : JOHN HOBES, WOLFGANG PAYER, DETLEF DEYMANN

It is certified that error appears in the above-identified patent and that said Letters Patent is hereby corrected as shown below:

Column 1, before line 3, insert the following:

--BACKGROUND OF THE INVENTION

Field of the Invention

The present invention relates to a process for preparing pulverulent ethylene polymers with a grain size below 200µm, which can be used in particular as coating material.

Discussion of Prior Art

Polymer powders suitable for coating objects and articles of widely varying types of heat-resistant materials by dip coating and spray coating methods, e.g. fluidized bed coating or flame spraying, must have accurately defined grain sizes and grain size distributions. Such powders are obtained from a coarse-grained product by grinding, e.g. in a Pallmann mill followed by screening, or by suitable precipitation methods from the polymer solution.

Both methods are technically time consuming and involve considerable expense. The grinding of the tough elastic

UNITED STATES PATENT AND TRADEMARK OFFICE
CERTIFICATE OF CORRECTION

PATENT NO. : 4,446,311

DATED : May 1, 1984

INVENTOR(S) : JOHN HOBES, WOLFGANG PAYER, DETLEF DEYMANN

It is certified that error appears in the above-identified patent and that said Letters Patent is hereby corrected as shown below:

products must generally be carried out at low temperatures, while precipitation methods require the use of considerable amounts of liquid. Thus, for example, for the quantitative precipitation of acrylic acid-containing and acrylate-containing ethylene copolymers from their solutions in aromatic hydrocarbons, twice as much, expressed in parts by weight, precipitation agent, e.g. ketones, lower alcohols, lower esters or nitromethane, as solvent is required. ---

Signed and Sealed this

Fourth Day of December 1984

[SEAL]

Attest:

GERALD J. MOSSINGHOFF

Attesting Officer      Commissioner of Patents and Trademarks